United States Patent
Reed et al.

(10) Patent No.: US 10,198,964 B2
(45) Date of Patent: Feb. 5, 2019

(54) INDIVIDUALIZED REHABILITATION TRAINING OF A HEARING PROSTHESIS RECIPIENT

(71) Applicant: Cochlear Limited, Macquarie University, NSW (AU)

(72) Inventors: Kieran Reed, Eastwood (AU); John Michael Heasman, Hampton (AU); Alex von Brasch, Cremorne (AU); Stephen Fung, Dundas Valley (AU)

(73) Assignee: Cochlear Limited, Macquarie University (AU)

( * ) Notice: Subject to any disclaimer, the term of this patent is extended or adjusted under 35 U.S.C. 154(b) by 199 days.

(21) Appl. No.: 15/206,558

(22) Filed: Jul. 11, 2016

(65) Prior Publication Data
US 2018/0012511 A1 Jan. 11, 2018

(51) Int. Cl.
*G09B 21/00* (2006.01)
*G06F 3/16* (2006.01)

(52) U.S. Cl.
CPC ........... *G09B 21/009* (2013.01); *G06F 3/167* (2013.01)

(58) Field of Classification Search
CPC ...................................................... G09B 21/00
See application file for complete search history.

(56) References Cited

U.S. PATENT DOCUMENTS

| | | | |
|---|---|---|---|
| 6,584,440 B2 | 6/2003 | Litovsky | |
| 7,676,372 B1 | 3/2010 | Oba | |
| 8,078,465 B2 | 12/2011 | Paul et al. | |
| 8,693,639 B2 | 4/2014 | Rottier et al. | |
| 2002/0107692 A1* | 8/2002 | Litovsky | A61B 5/121 |
| | | | 704/270 |
| 2004/0230431 A1 | 11/2004 | Gupta et al. | |
| 2005/0027537 A1* | 2/2005 | Krause | G10L 25/00 |
| | | | 704/271 |
| 2006/0093997 A1 | 5/2006 | Kearby et al. | |
| 2008/0124685 A1 | 5/2008 | Chalupper | |
| 2012/0021390 A1 | 1/2012 | Dodd | |
| 2014/0336448 A1 | 11/2014 | Banna et al. | |

FOREIGN PATENT DOCUMENTS

| EP | 2924676 A1 | 9/2015 |
|---|---|---|
| WO | 2010/017156 A1 | 2/2010 |

OTHER PUBLICATIONS

H. Deprez, et al. "Automating speech reception threshold measurements using automatic speech recognition", SLPAT 2013, 4th Workshop on Speech and Language Processing for Assistive Technologies, pp. 35-40, Grenoble, France, Aug. 21-22, 2013, 2013 Association for Computational Linguistics, 6 pages.
E. Yilmaz, "Speech Reception Threshold Measurement Using Automatic Speech Recognition", IEEE International Conference on Acoustics, Speech, and Signal Processing, ICASSP'2014, Edition 39, Florence, Italy, May 4-9, 2014, 4 pages.
Clive Thompson, "Speak and Spell: How Dictation Software Makes Us Rethink Writing", Wired, Gadget Lab, Sep. 19, 2015, http://www.wired.com/2015/09/thompson-2/, 7 pages.

* cited by examiner

*Primary Examiner* — Omkar Deodhar
(74) *Attorney, Agent, or Firm* — Edell, Shapiro & Finnan, LLC

(57) ABSTRACT

Presented herein are techniques for increasing the user experience of implantable hearing prostheses through improvements in post-implantation clinical care.

20 Claims, 11 Drawing Sheets

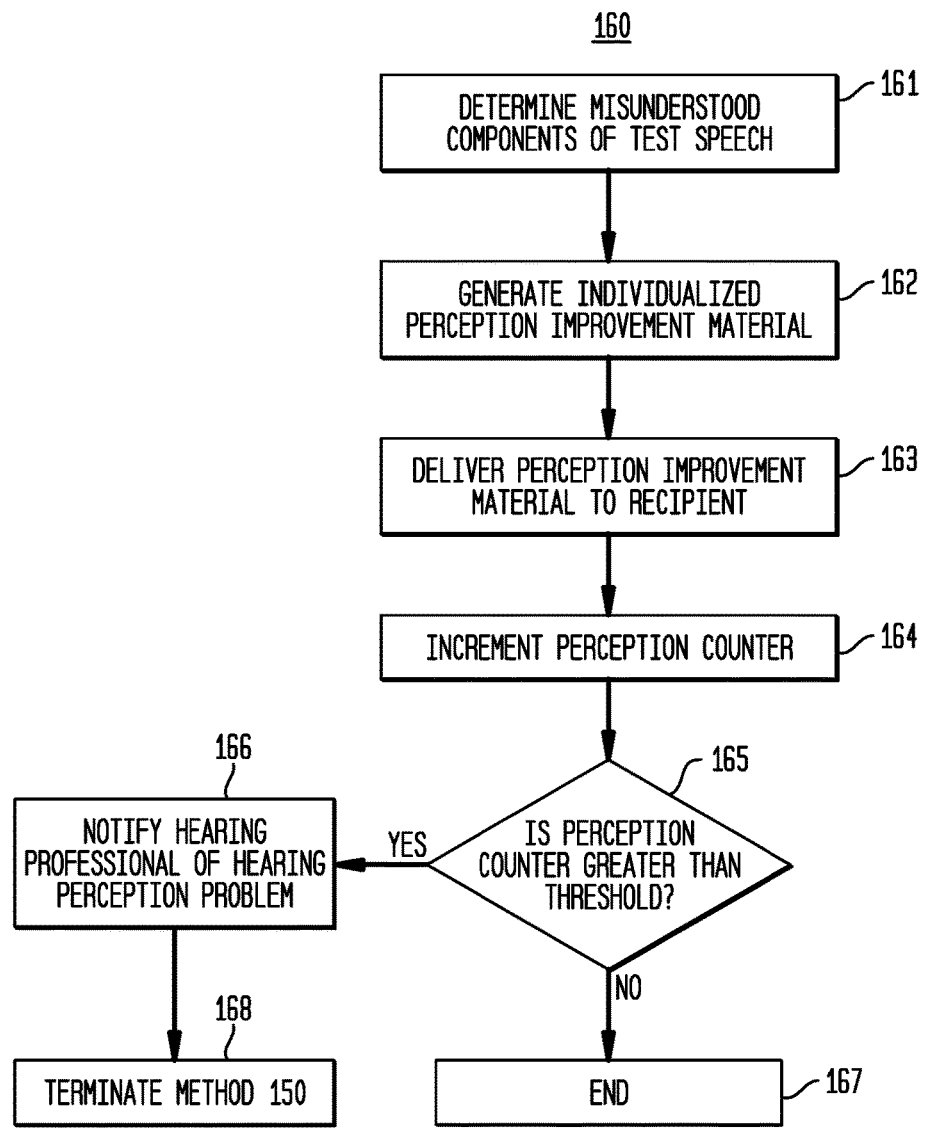

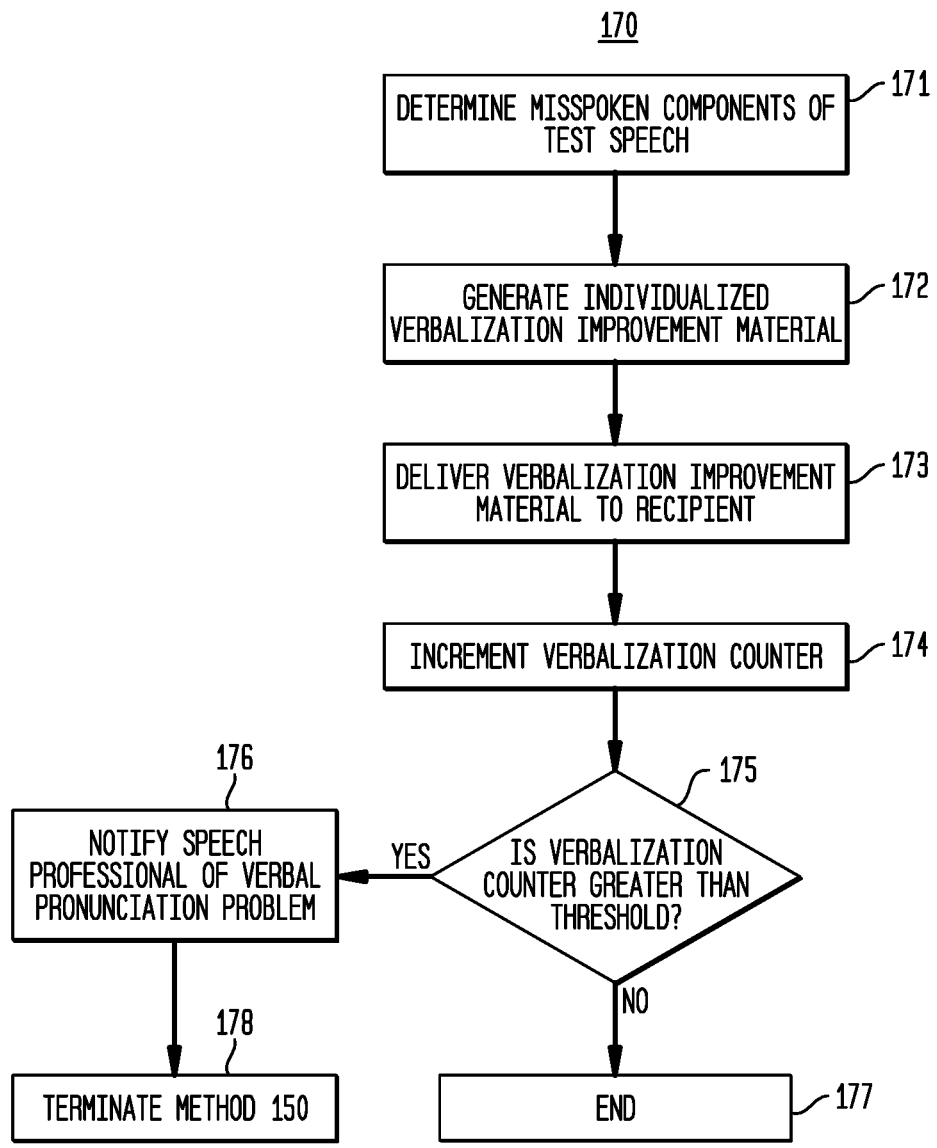

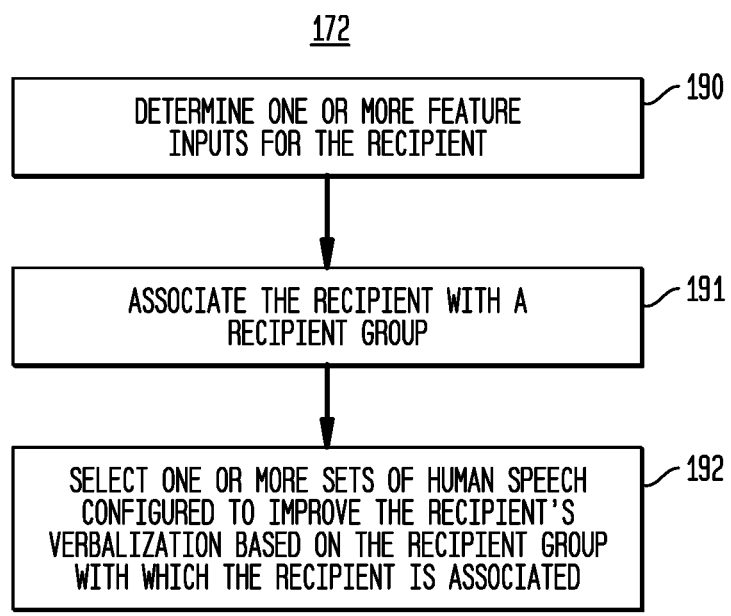

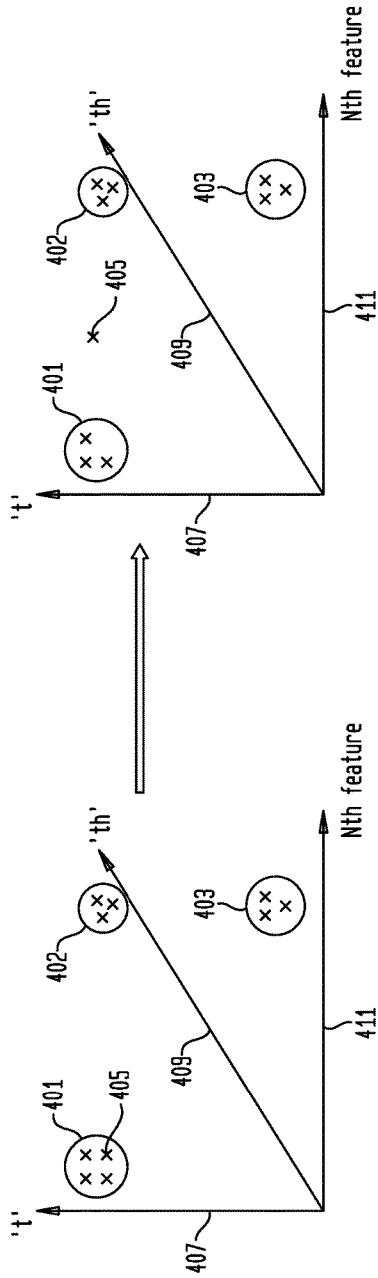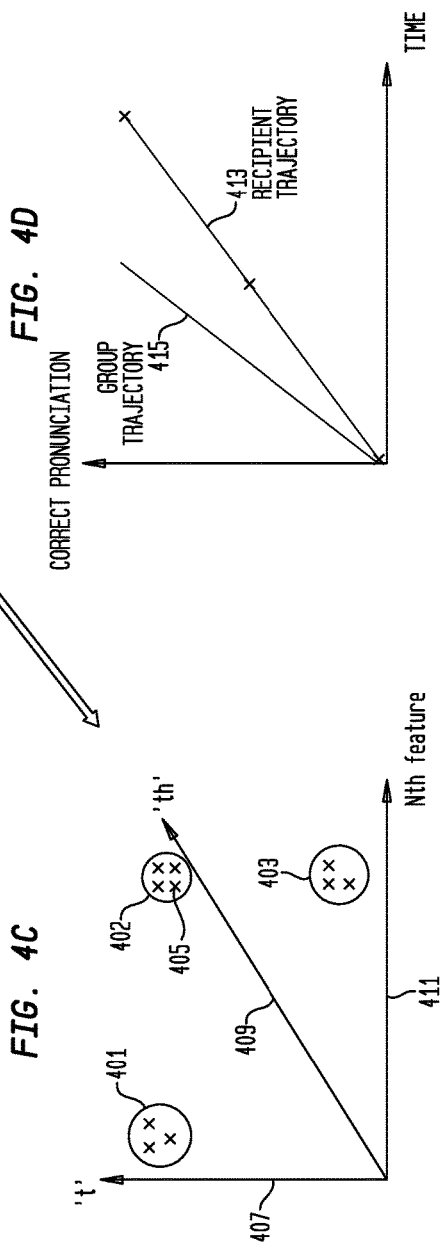

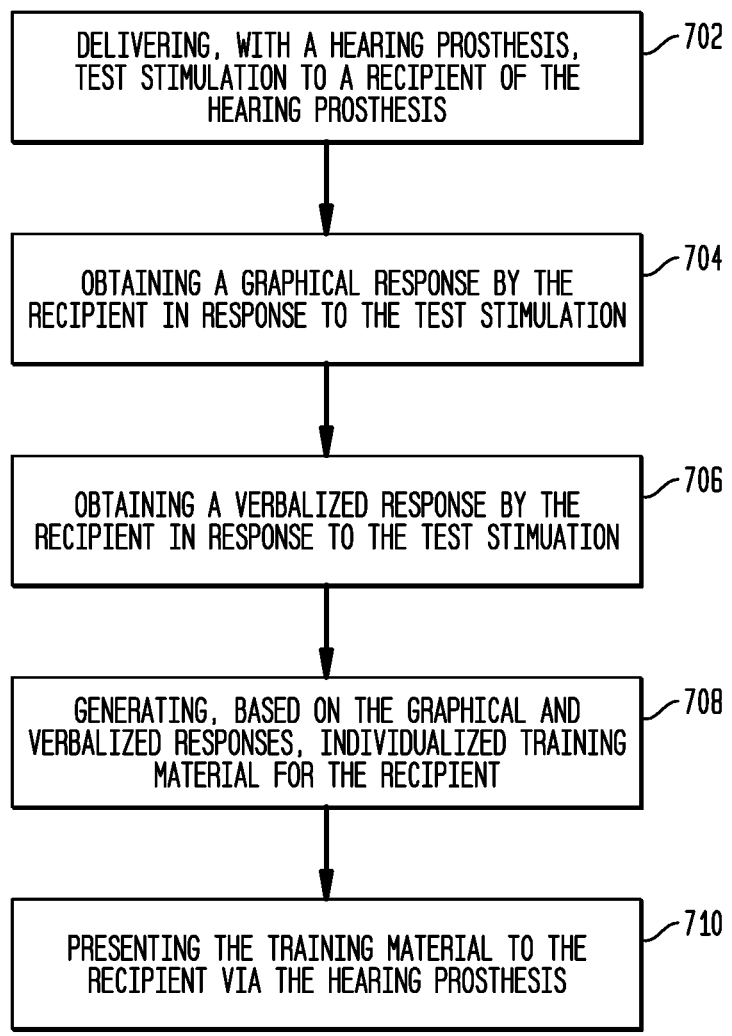

INDIVIDUALIZED REHABILITATION TRAINING OF A HEARING PROSTHESIS RECIPIENT

BACKGROUND

Field of the Invention

The present invention relates generally to hearing prostheses.

Related Art

Hearing loss, which may be due to many different causes, is generally of two types, conductive and/or sensorineural. Conductive hearing loss occurs when the normal mechanical pathways of the outer and/or middle ear are impeded, for example, by damage to the ossicular chain or ear canal. Sensorineural hearing loss occurs when there is damage to the inner ear, or to the nerve pathways from the inner ear to the brain.

Individuals who suffer from conductive hearing loss typically have some form of residual hearing because the hair cells in the cochlea are undamaged. As such, individuals suffering from conductive hearing loss typically receive an auditory prosthesis that generates motion of the cochlea fluid. Such auditory prostheses include, for example, acoustic hearing aids, bone conduction devices, and direct acoustic stimulators.

In many people who are profoundly deaf, however, the reason for their deafness is sensorineural hearing loss. Those suffering from some forms of sensorineural hearing loss are unable to derive suitable benefit from auditory prostheses that generate mechanical motion of the cochlea fluid. Such individuals can benefit from implantable auditory prostheses that stimulate nerve cells of the recipient's auditory system in other ways (e.g., electrical, optical and the like). Cochlear implants are often proposed when the sensorineural hearing loss is due to the absence or destruction of the cochlea hair cells, which transduce acoustic signals into nerve impulses. An auditory brainstem stimulator is another type of stimulating auditory prosthesis that might also be proposed when a recipient experiences sensorineural hearing loss due to damage to the auditory nerve.

Certain individuals suffer from only partial sensorineural hearing loss and, as such, retain at least some residual hearing. These individuals may be candidates for electro-acoustic hearing prostheses that deliver both electrical and acoustical stimulation.

SUMMARY

In one aspect, a method is provided. The method comprises: delivering, with a hearing prosthesis, test stimulation to a recipient of the hearing prosthesis; obtaining a graphical response by the recipient in response to the test stimulation; obtaining a verbalized response by the recipient in response to the test stimulation; generating, based on the graphical and verbalized responses, individualized training material for the recipient; and presenting the individualized training material to the recipient via the hearing prosthesis.

In another aspect, a hearing prosthesis system is provided. The hearing prosthesis comprises a hearing prosthesis configured to deliver test stimulation to a recipient, and one or more processors configured to: analyze a graphical response of the recipient to the test stimulation relative to at least a verbalized response by the recipient to the test stimulation and human speech represented by the test stimulation, generate, based on the analysis of the graphical response relative to at least the verbalized response and the human speech represented by the test stimulation, individualized training material for the recipient, and initiate rehabilitation training of the recipient using the individualized training material.

BRIEF DESCRIPTION OF THE DRAWINGS

Embodiments of the present invention are described herein in conjunction with the accompanying drawings, in which:

FIG. 2B is a flowchart illustrating a perception training process of FIG. 2A;

FIG. 2C is a flowchart illustrating a verbalization training process of FIG. 2A;

FIG. 3 is a flowchart illustrating a process for generation of verbalization training material in accordance with the verbalization training process of FIG. 2C;

FIGS. 4A-4C are a series of diagrams illustrating one specific example for generation of verbalization improvement material for delivery to a recipient in accordance with embodiments presented herein;

FIG. 4D is a graph illustrating a trajectory of a recipient's verbalization improvement in response to delivery of verbalization improvement material in accordance with embodiments presented herein;

FIG. 7 is a flowchart of a method in accordance with embodiments presented herein.

DETAILED DESCRIPTION

Figure 1A:
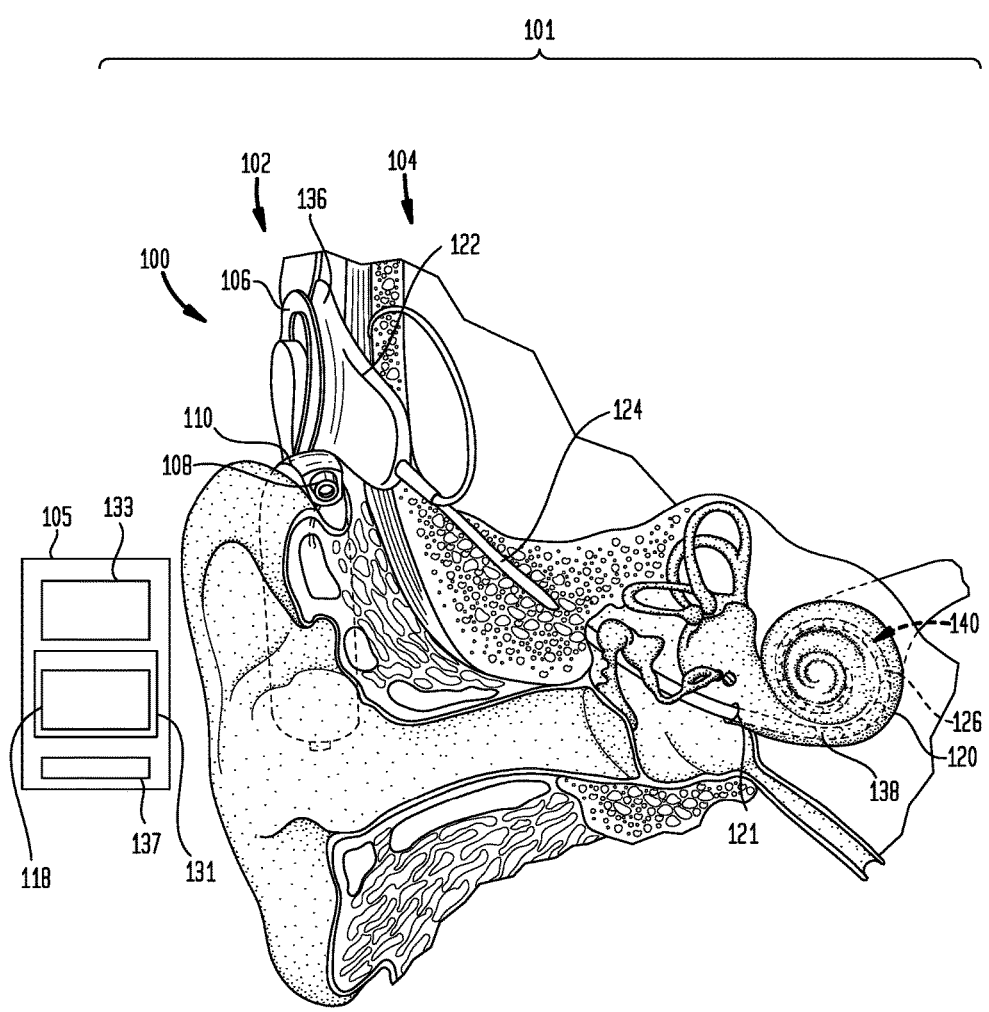
FIG. 1A is a schematic diagram of a hearing prosthesis system in accordance with embodiments presented herein.

Hearing professionals, such as clinicians, audiologists, etc., are burdened with an increasing number of hearing prosthesis recipients to manage on a daily basis. This increase in the total number of recipients coupled with an increasing number of recipients who have significant residual hearing in the contralateral or ipsilateral ear (e.g., due to the increased ability to preserve a recipient's residual hearing during implantation). The complexity of acoustic-electric hearing (i.e., acoustic stimulation in combination with electrical stimulation) further increases the time demands placed on hearing professionals.

The overall objective of hearing prostheses is to make the experience of use (recipient or user experience) as beneficial for the recipient as possible. The user experience is, in general, contingent on a number of factors which include surgery, etiology, clinical device configuration/optimization, etc. Presented herein are techniques for increasing the user experience of implantable hearing prostheses through improvements in post-implantation clinical care without increasing, and possibly reducing, the time demands place on professionals involved in a recipient's post-implantation care. Post-implantation clinical care may include, for example, speech and language habilitation/rehabilitation, speech pathology, etc. As such, the professionals involved in a recipient's post-implantation care may include hearing professions and speech professionals (e.g., speech pathologists, etc.)

In accordance with the techniques presented herein, a recipient's hearing (i.e., the recipient perception of speech, sometimes referred to herein as the recipient's hearing perception) and a recipient's verbal pronunciation (i.e., the recipient's ability to voice speech, sometimes referred to herein as the recipient's verbalization) are tested and analyzed together (e.g., analyzed relative to one another and/or to presented speech) to generate, for example, measures of progress or individualized rehabilitation training materials, such as hearing perception improvement training materials, verbalization (verbal pronunciation) improvement training materials, etc. The techniques may be particularly useful for pediatric recipients who are still developing speech and/or for new language learners, particularly where basic sounds in the new language are unfamiliar to the recipient.

For ease of illustration, embodiments are primarily described herein with reference to a hearing prosthesis system that includes an electro-acoustic hearing prosthesis comprising a cochlear implant portion and a hearing aid portion. However, it is to be appreciated that the techniques presented herein may be used with other types of hearing prostheses systems, such as systems that include cochlear implants, direct acoustic stimulators, middle ear implants/stimulators, hearing aids, bone conduction devices, auditory brainstem implants, bi-modal hearing prostheses, and/or electro-acoustic hearing prostheses comprising other types of output devices (e.g., auditory brainstem stimulators portions, direct acoustic stimulator portions, bone conduction device portions, etc.).

Figure 1B:
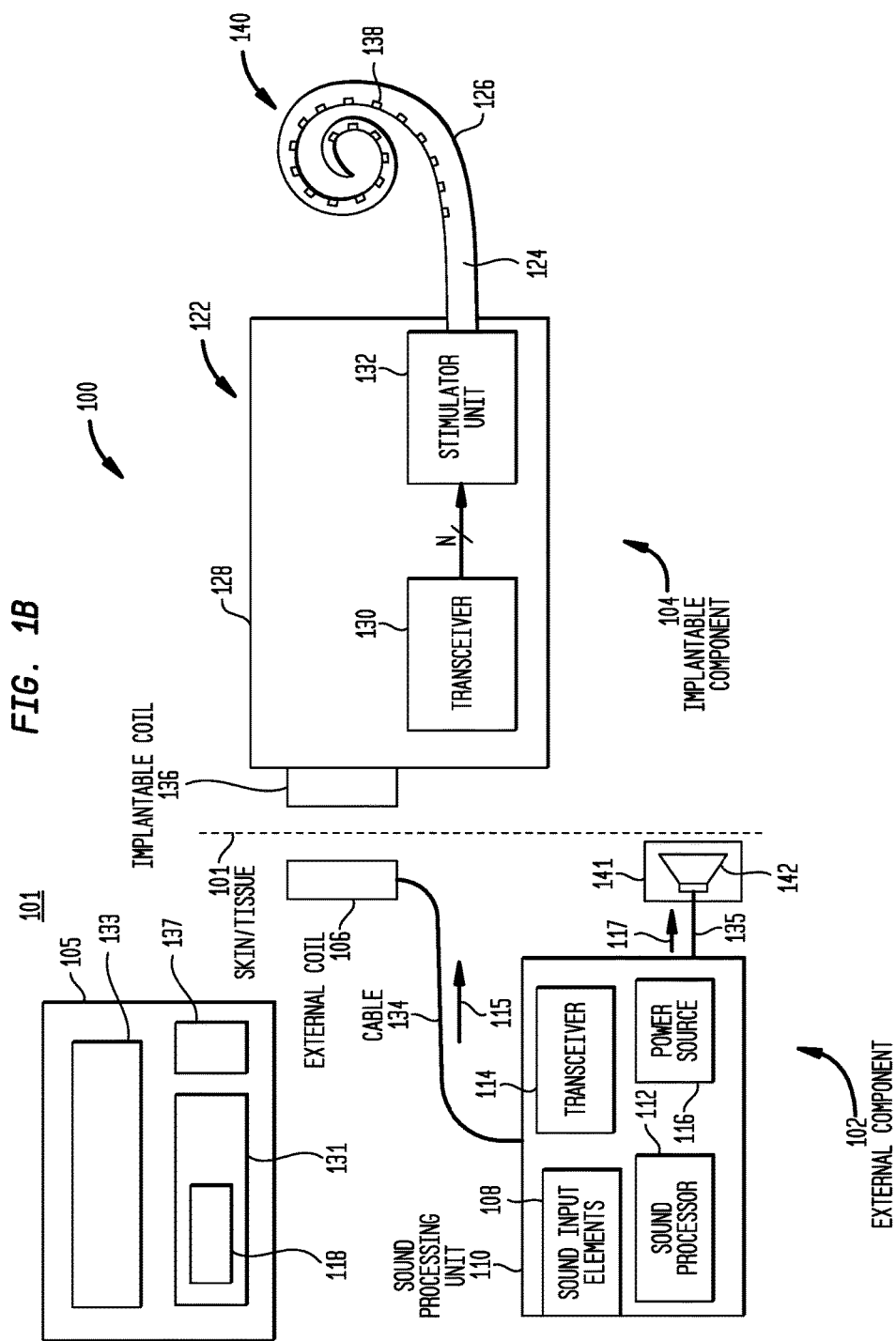
FIG. 1B is a block diagram of the hearing prosthesis system of FIG. 1A.

FIGS. 1A and 1B are diagrams of an illustrative hearing prosthesis system 101 configured to implement the techniques presented herein. More specifically, FIGS. 1A and 1B illustrate hearing prosthesis system 101 that comprises an electro-acoustic hearing prosthesis 100 and an external device 105. The external device 105 is a computing device, such as a computer (e.g., laptop, desktop, tablet), mobile phone, remote control unit, etc. The external device 105 comprises an individualized training module 118 that, as described further below, is configured to analyze recipient responses to test stimulation and to generate individualized training material. That is, the individualized training module 118 is configured to generate training material that is designed to improve specifically identified hearing perception and/or verbalization (verbal pronunciation) problems experienced by the recipient.

In one form, the individualized training module 118 is implemented as software, sometimes referred to herein as individualized training software, at external device 105. That is, the external device 105 comprises memory 131 (e.g., one or more tangible (non-transitory) computer readable storage media, such as read only memory (ROM), random access memory (RAM), or another type of physical/tangible memory storage device) configured to store the individualized training software. The external device 105 also comprises one or more processors 137 such that, when the individualized training software is executed by the processors 137, the external device 105 is operable to perform the operations described herein with reference to individualized training module 118.

As shown in FIGS. 1A and 1B, the external device 105 also comprises a user interface 133. The user interface 133 may take many different forms and may include, for example, one or more of a keypad, keyboard, mouse, touchscreen, display screen, etc.

The implantable electro-acoustic hearing prosthesis 100 includes an external component 102 and an internal/implantable component 104. The external component 102 is configured to be directly or indirectly attached to the body of a recipient, while the implantable component 104 is configured to be subcutaneously implanted within the recipient (i.e., under the skin/tissue of the recipient).

The external component 102 comprises a sound processing unit 110, an external coil 106, and, generally, a magnet (not shown in FIG. 1A) fixed relative to the external coil 106. The external coil 106 is connected to the sound processing unit 110 via a cable 134. The sound processing unit 110 comprises one or more sound input elements 108 (e.g., microphones, audio input ports, cable ports, telecoils, a wireless transceiver, etc.), a wireless transceiver 114, a sound processor 112, and a power source 116. The sound processing unit 110 may be, for example, a behind-the-ear (BTE) sound processing unit, a body-worn sound processing unit, a button sound processing unit, etc.

Connected to the sound processing unit 110 via a cable 135 is a hearing aid component 141. The hearing aid component 141 includes a receiver 142 (FIG. 1B) that may be, for example, positioned in or near the recipient's outer ear. The receiver 142 is an acoustic transducer that is configured to deliver acoustic signals (acoustic stimulation signals) to the recipient via the recipient's ear canal and middle ear.

As shown in FIG. 1B, the implantable component 104 comprises an implant body (main module) 122, a lead region 124, and an elongate intra-cochlear stimulating assembly 126. The implant body 122 generally comprises a hermetically-sealed housing 128 in which an internal transceiver unit (transceiver) 130 and a stimulator unit 132 are disposed. The implant body 122 also includes an internal/implantable coil 136 that is generally external to the housing 128, but which is connected to the transceiver 130 via a hermetic feedthrough (not shown in FIG. 1B). Implantable coil 136 is typically a wire antenna coil comprised of multiple turns of electrically insulated single-strand or multi-strand platinum or gold wire. The electrical insulation of implantable coil 136 is provided by a flexible molding (e.g., silicone molding), which is not shown in FIG. 1B. Generally, a magnet is fixed relative to the implantable coil 136.

Elongate stimulating assembly 126 is configured to be at least partially implanted in the recipient's cochlea 120 (FIG. 1A) and includes a plurality of longitudinally spaced intra-cochlear electrical stimulating contacts (electrodes) 138 that collectively form a contact array 140 for delivery of electrical stimulation (current) to the recipient's cochlea.

Stimulating assembly 126 extends through an opening 121 in the cochlea (e.g., cochleostomy, the round window, etc.) and has a proximal end connected to stimulator unit 132 via lead region 124 and a hermetic feedthrough (not shown in FIG. 1B). Lead region 124 includes a plurality of conductors (wires) that electrically couple the electrodes 138 to the stimulator unit 132.

Returning to external component 102, the sound input element(s) 108 are configured to detect/receive input sound signals and to generate electrical input signals therefrom. The sound processor 112 is configured execute sound processing and coding to convert the electrical input signals received from the sound input elements into output signals that represent acoustic and/or electric (current) stimulation for delivery to the recipient. That is, as noted, the electro-acoustic hearing prosthesis 100 operates to evoke perception by the recipient of sound signals received by the sound input elements 108 through the delivery of one or both of electrical stimulation signals and acoustic stimulation signals to the recipient. As such, depending on a variety of factors, the sound processor 112 is configured to convert the electrical input signals received from the sound input elements into a first set of output signals representative of electrical stimulation and/or into a second set of output signals representative of acoustic stimulation. The output signals representative of electrical stimulation are represented in FIG. 1B by arrow 115, while the output signals representative of acoustic stimulation are represented in FIG. 1B by arrow 117.

The output signals 115 are, in the examples of FIGS. 1A and 1B, encoded data signals that are sent to the implantable component 104 via external coil 106. More specifically, the magnets fixed relative to the external coil 106 and the implantable coil 136 facilitate the operational alignment of the external coil 106 with the implantable coil 136. This operational alignment of the coils enables the external coil 106 to transmit the encoded data signals, as well as power signals received from power source 116, to the implantable coil 136. In certain examples, external coil 106 transmits the signals to implantable coil 136 via a radio frequency (RF) link. However, various other types of energy transfer, such as infrared (IR), electromagnetic, capacitive and inductive transfer, may be used to transfer the power and/or data from an external component to an electro-acoustic hearing prosthesis and, as such, FIG. 1B illustrates only one example arrangement.

In general, the encoded data and power signals are received at the transceiver 130 and are provided to the stimulator unit 132. The stimulator unit 132 is configured to utilize the encoded data signals to generate electrical stimulation signals (e.g., current signals) for delivery to the recipient's cochlea via one or more stimulating contacts 138. In this way, electro-acoustic hearing prosthesis 100 electrically stimulates the recipient's auditory nerve cells, bypassing absent or defective hair cells that normally transduce acoustic vibrations into neural activity, in a manner that causes the recipient to perceive one or more components of the received sound signals.

As noted above, it is common for hearing prosthesis recipients to retain at least part of this normal hearing functionality (i.e., retain at least one residual hearing). Therefore, the cochlea of a hearing prosthesis recipient can be acoustically stimulated upon delivery of a sound signal to the recipient's outer ear. In the example of FIGS. 1A and 1B, the receiver 142 is used to provide the acoustic stimulation. That is, the receiver 142 is configured to utilize the output signals 117 to generate acoustic stimulation signals that are provided to the recipient's cochlea via the middle ear bones and oval window, thereby creating waves of fluid motion of the perilymph within the cochlea.

Although FIGS. 1A and 1B illustrate the use of a receiver 142 to deliver acoustic stimulation to the recipient, it is to be appreciated that other types of devices may be used in other embodiments. It is also to be appreciated that embodiments of the present invention may be implemented in other hearing prostheses and other arrangements that that shown in FIGS. 1A and 1B.

As noted, the external device 105 comprises the individualized training module 118. As described further below, the individualized training module 118 is configured to, based on graphical and/or verbalized recipient responses to test stimulation, generate individualized training material to improve a recipient's user experience. In particular, the individualized training module 118 is configured to generate training material that is personalized for the user and specifically designed to address hearing perception and/or verbalization problems experienced by the recipient.

Figure 2A:
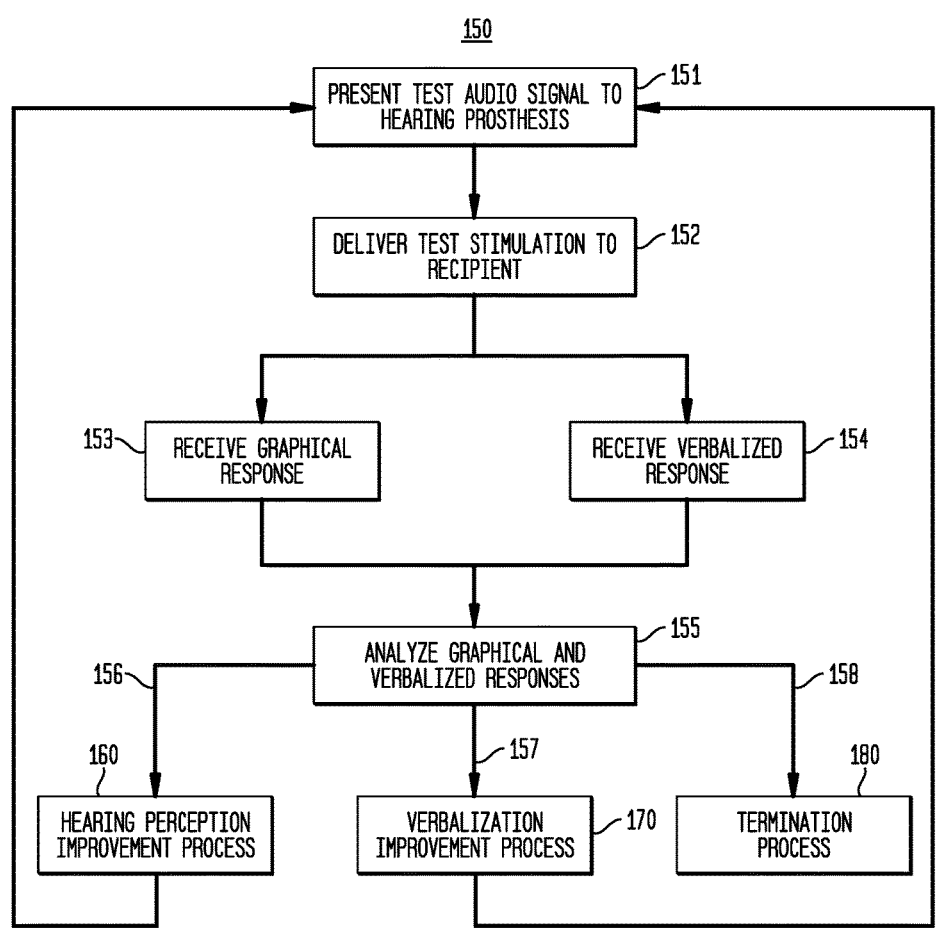
FIG. 2A is a flowchart illustrating a method for hearing prosthesis recipient training in accordance with embodiments presented herein.

FIG. 2A is a flowchart of a method 150 for use of graphical (i.e., non-verbalized) responses, such as written/typed responses, in combination with a voiced/verbalized response to create individualized training materials for a hearing prosthesis recipient in accordance with embodiments presented herein. For ease of illustration, the method 150 of FIG. 2A is described with reference to the electroacoustic hearing prosthesis system 101 of FIGS. 1A and 1B.

Method 150 begins at 151 where a test audio signal is presented to the hearing prosthesis 100. As described further below, the test audio signal may be presented to the recipient and number of different manners and generally represents some form of human speech, such one or more words or phrases. In other words, the content of the test audio signal is some form of "test speech." At 152, the test audio signal is converted into test stimulation (e.g., electrical and/or acoustic stimulation signals) by the electro-acoustic hearing prosthesis 100 and the test stimulation delivered to the recipient. As generated, the test stimulation is intended to represent the test speech (e.g., the words/phrases forming the test audio signal) and enable the recipient to hear (i.e., perceive) the test speech.

In response to delivery of the test stimulation to the recipient, the recipient is tasked with providing two different types of responses representing speech (i.e., what word or phrase) the recipient understood (i.e., heard/perceived) in response to delivery of the test stimulation. In particular, at 153 a graphical response representing what the recipient heard in response to the test stimulation is received from the recipient and, at 154, a verbalized/voiced response is received from the recipient.

In the specific example of FIG. 2A, the graphical response is some form of a non-verbalized response, such as written or typed response or pictorial response, but other types of graphical responses are possible. In one form, the typed response may be, for example, a text word or phrase entered by the recipient into external device 105, a word or phrase identified in response to the selection of an image at a display at external device 105 (e.g., selection from among a plurality of images presented on the display screen), etc.

The verbalized response is a word or phrase spoken by the recipient and which is detected or received by the external device 105. In one example, the verbalized response is obtained using automatic voice recognition software on the recipient's voice. That is, the hearing prosthesis 100 and/or the external device 105 is configured to performing automatic voice recognition on speech produced by the recipient to obtain the verbalized response.

In general, the graphical response is an indicator of what the recipient heard when the test stimulation was delivered to the recipient. However, the verbalized response may not necessarily indicate what the recipient heard, but instead is an indicator of the recipient's speech (verbalization) abilities. Therefore, as described further below, an analysis of the graphical response and verbalized response in relation to the test speech can be used to determine whether the recipient has trouble understanding the test speech or trouble verbalizing the speech, as well as what components/elements of the test speech are problematic for the recipient. That is, the two different types of two responses, when analyzed together, allow discrimination of hearing and speaking problems.

More specifically, at 155, the graphical response and the voiced response (e.g., obtained through automated voice recognition) are analyzed by the individualized training module 118 to determine if the responses match the test speech. That is, the two different types of responses are compared to one another and to the content of the test audio signal to determine: (1) whether the word or phrase spoken by the recipient is substantially identical to the word or phrase indicated in the graphical response, and (2) whether the graphical response and the verbalized response match the word or phrase represented by the test audio signal (i.e., match the test speech) The comparison at 155 may have a number of outcomes, three of which are shown at 156, 157, and 158 in FIG. 2A.

Figure 2D:
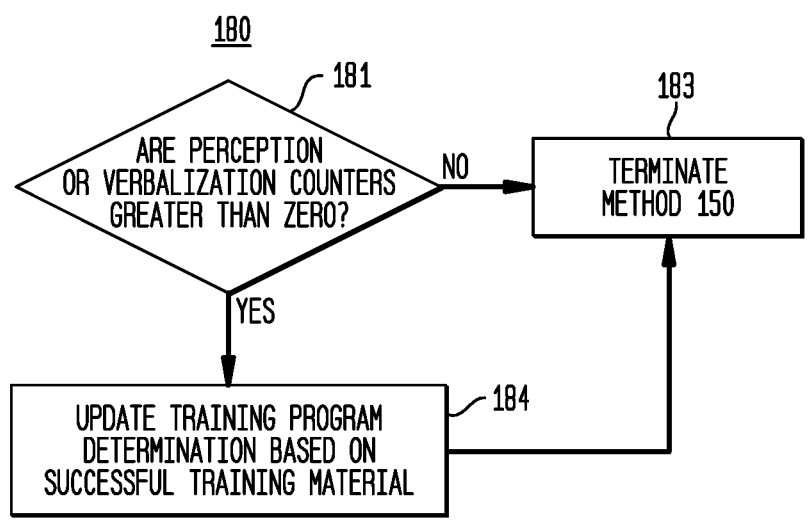
FIG. 2D is a flowchart illustrating a termination process of FIG. 2A.

More specifically, outcome 156 represents a determination that the verbalized response matches the graphical response (i.e., the word or phrase spoken by the recipient is substantially identical to the word or phrase indicated in the graphical response), but the responses do not match the test speech (i.e., the word or phrase presented by the test audio signal). Outcome 157 represents a determination that the graphical response matches the test speech, but that the verbalized response does not match the graphical response. Outcome 158 represents a determination that the graphical response and the verbalized response match one another and both match the test speech. As described further below and as shown in FIG. 2A, each of the three outcomes 156, 157, and 158 result in different operations. In particular, outcome 156 results in the execution of one form of rehabilitation training referred to herein as a hearing perception improvement process 160, the details of which are shown in FIG. 2B. Outcome 157 results in the execution of another form of rehabilitation training referred to herein as verbalization improvement process 170, the details of which are shown in FIG. 2C. Finally, outcome 158 results in the execution of a termination process 180, the details of which are shown in FIG. 2D.

Although not shown in FIG. 2A, another outcome is that the graphical response and the verbalized responses do not match one another nor the test speech. In such an outcome, it is determined that the recipient did not understand the test speech and no determination can be made about their verbalization/pronunciation. In such examples, the same or other test speech may be re-presented to the recipient.

Referring first to FIG. 2B, the hearing perception improvement process 160 begins at 161 where the individualized training module 118 determines which components/elements of the test audio signal were misunderstood (not perceived correctly in response to the test stimulus) by the recipient. That is, since the graphical response is incorrect (i.e., does not match the test audio signal content), but does match the verbalized response, the individualized training module 118 determines that the recipient is suffering from a hearing perception problem (i.e., a difficulty in understanding the audio signal in response to the test stimulus), rather than a verbalization problem (i.e., a difficulty in verbalizing/speaking the word or phrase perceived by the recipient).

Within a specific language, human speech is comprised of a number of perceptually distinct units. For example, "phonemes" are the smallest units of sound in a language, while "morphemes" are the smallest meaningful unit in the grammar of a language. Both phonemes and morphemes may be formed by one or more letters and may be used to distinguish one word from another (e.g., the difference in meaning between the English words "thin" and "fin" is a result of the exchange of the phoneme /th/ for the phoneme /f/. Therefore, at 161, the individualized training module 118 determines which phonemes, morphemes, or other elements of the test speech (i.e., the word or phrase represented by the test audio signal) have been misunderstood by the recipient (i.e., determining phonetic, morphological, and/or other differences between the voice/graphical responses and the test speech).

After determining which components of the test speech that have been misunderstood by the recipient, process 160 proceeds to 162 where the misunderstood components are used to create individualized training material for the recipient. In particular, since process 160 follows 156 of FIG. 2A where the verbalized and graphical responses match, but do not match the test speech, the individualized training material created at 162 is intended to improve hearing perception by the recipient, particularly the recipient's hearing perception of the misunderstood components of the test speech. The individualized training material created at 162, referred to herein as perception improvement material, includes one or more sets of human speech (i.e., one or more words, phrases, etc.) specifically targeted towards the misunderstood components of the test audio signal, along with a strategy (e.g., timing, order, etc.) for presentation of one or more sets of human speech to the recipient.

At 163, the perception improvement material is delivered to the recipient via the hearing prosthesis 100. In particular, the one or more sets of human speech are provided to the hearing prosthesis 100 as training audio signals. These training audio signals are then converted into training stimulation (i.e., acoustic and/or electrical stimulation). Although not shown in FIG. 2B, the individualized training at 163 may include steps in which the recipient provides graphical and/or verbalized responses regarding what he/she perceives in response to the training stimulation. These responses may be used, for example, to adapt the current or future training material.

After the perception improvement material has been delivered to the recipient, at 164 the individualized training module 118 increments a "perception counter." The perception counter maintains a count of how many times the recipient has received perception improvement material. Therefore, at an initial pass through process 160, the counter is incremented from zero (0) to one (1).

Although FIG. 2B illustrates the use of a perception counter, other counters may be used in alternative embodiments. For example, counters for phonemes, morphemes, words, sentences, etc. may be used in with, or in place of, the perception counter.

At 165, a determination is made as to whether or not the perception counter is greater than a threshold value. If the perception counter is greater than the threshold, process 160 proceeds to 166 where a hearing professional is notified that the recipient is experiencing a hearing perception problem. In other words, the threshold represents the number of times the recipient may receive hearing perception training before a hearing professional is notified. The notification to a hearing professional may include, for example, information regarding the specific perception problem or problems, information regarding the previously presented perception improvement material, etc. Once the hearing professional is notified, the method 150 may be terminated at 168.

As shown at 167, if the perception counter is not greater than the threshold, then the hearing perception improvement process 160 ends. As shown in FIG. 2A, the method 150 then returns to 151 where a test audio signal is again presented to the recipient. The test audio signal may be the same or different test audio signal as initially presented to the recipient.

In certain examples, a recipient's verbalized responses, and/or the results of the hearing perception improvement process may be used to adjust operation of the hearing prosthesis. For example, using the speech test results, it is possible to find the noise levels and noise types that an individual recipient finds difficult. Identification of these noise types and levels allows the personalization and training of the hearing prosthesis operations, such as the environmental classification operations, to switch between sound processing modes (e.g., between Speech, Speech+Noise, Noise, or other processing modes) at these noise types and levels. The algorithm control and aggressiveness may be set using the collected data from the speech test. Subjective testing would also be included as a test if algorithm aggressiveness was to be set. Table 1, below, illustrates an example hearing prosthesis settings based on verbalization responses and/or perception training.

TABLE 1

| Noise Type | Speech test score (dB) - Negative is good | Algorithm Aggressiveness |
| --- | --- | --- |
| 4 talker babble | 0 | −10 |
| 8 talker babble | −4 | −6 |
| 20 talker babble | −6 | −4 |
| ILTASS | −10 | 0 |

Therefore, in this example, 4 talker babble classification is considered 'Noise' below 0 dB signal to noise ratio (SNR) and 'Speech+Noise' when above 0 dB SNR. Eight talker babble classification is considered 'Noise' below −4 dB SNR and 'Speech+Noise' when above −4 dB SNR. Twenty talker babble classification is considered 'Noise' below −6 dB SNR and 'Speech+Noise' when above −6 dB SNR. ILTASS classification is considered 'Noise' below 10 dB SNR and 'Speech+Noise' when above −10 dB SNR. If the environmental classification of the hearing prosthesis indicates 4 talker babble, then the aggressiveness of a noise reduction algorithm would be greater than what would be set for classifier detection of International Long Term Average Speech Spectrum (ILTASS). This is seen as an example in the third column of the above table.

Returning to the example of FIG. 2A, as noted there are three outcomes 156, 157, and 158 to the analysis at 155, where each outcome results in the execution of different processes, namely processes 160, 170, and 180, respectively. The details of verbalization improvement process 170 will be described next with reference to FIG. 2C.

More specifically, FIG. 2C illustrates that the verbalization improvement process 170 begins at 171 where the individualized training module 118 determines which components/elements of the test audio signal were misspoken by the recipient. That is, since the graphical response is correct (i.e., matches the test speech), but does not match the verbalized response, the individualized training module 118 determines that the recipient is suffering from a verbalization problem (i.e., a difficulty in verbalizing/speaking the word or phrase correctly perceived by the recipient), rather than a hearing perception problem (i.e., a difficulty in understanding the test speech in response to the test stimulation).

As noted above, within a specific language, speech is comprised of a number of perceptually distinct units (e.g., phonemes, morphemes, etc.) that distinguish words from one another. Therefore, at 171, the individualized training module 118 determines which phonemes, morphemes, or other elements of the word or phrase contained in the test speech have been misspoken by the recipient (i.e., determining phonetic, morphological, and/or other differences between the verbalized response and the graphical response).

After determining which components of the test speech that have been misspoken by the recipient, the process 170 proceeds to 172 where the misspoken components are used to create individualized training material for the recipient. In particular, since process 170 follows 157 of FIG. 2A where the graphical response matches the word or phrase represented by the test audio signal, but the verbalized response is incorrect, the individualized training material created at 172 is intended to improve verbalization by the recipient, particularly the recipient's verbalization of the misspoken components of the test speech. The individualized training material created at 172, referred to herein as verbalization improvement material, includes one or more sets of human speech in the form of words, phrases, etc., specifically targeted towards the misspoken components of the test speech, along with a strategy (e.g., timing, order, etc.) for presentation of the verbalization improvement material to the recipient. Further details regarding generation of verbalization improvement material are provided below with reference to FIGS. 3, 4A-4C, and 4D.

At 173, the verbalization improvement material is delivered to the recipient via the hearing prosthesis 100. In particular, the one or more sets of human speech are included in training audio signals that are provided to the hearing prosthesis 100. These training audio signals are then converted into training stimulation (i.e., acoustic and/or electrical stimulation). The operations at 173 also include steps in which the recipient provides verbalized, and possibly graphical, responses regarding the human speech perceived in response to the test stimulus.

After the verbalization improvement material has been delivered to the recipient, at 174 the individualized training module 118 increments a "verbalization counter." The verbalization counter maintains a count of how many times the recipient has received verbalization improvement training. Therefore, at an initial pass through process 170, the counter is incremented from 0 to 1.

At 175, a determination is made as to whether or not the verbalization counter is greater than a threshold value. If the verbalization counter is greater than the threshold, process 170 proceeds to 176 where a pathologist or other speech professional is notified that the recipient is experiencing a verbalization problem. In other words, the threshold represents the number of times the recipient may receive verbalization improvement training before a speech professional is notified. The notification to a speech professional may include, for example, information regarding the specific verbalization (verbal pronunciation) problem or problems, information regarding the previously delivered training material, etc. Once the speech professional is notified, the method 150 may be terminated at 178.

At 177, if the verbalization counter is not greater than the threshold, then the verbalization improvement process 170 ends. As shown in FIG. 2A, the method 150 then returns to 151 where a test audio signal is again presented to the recipient. The test audio signal may be the same or different test audio signal as initially presented to the recipient.

Again, as noted above, there are three outcomes 156, 157, and 158 of the analysis at 155, where each outcome results in the execution of different processes, namely processes 160, 170, and 180, respectively. Processes 160 and 170 described above are intended to improve a recipient's hearing perception or verbalization, respectively. Depending on the results of the analysis at 155, each of the processes 160 and 170 may be implemented, for example, repeatedly, alternatively, etc., until the method 150 is terminated. As noted above, method 150 may be terminated at 168 (FIG. 2B) or 178 (FIG. 2C). The method 150 may also be terminated by execution of termination process 180, the details of which are shown in FIG. 2D.

Termination process 180 is initiated when the graphical response and the verbalized response match one another and both match the word or phrase presented by the test audio signal (i.e., outcome 158). That is, outcome 158 indicates that the recipient has both correctly perceived the test speech and has correctly verbalized the test speech.

The termination process 180 begins at 181 where the individualized training module 118 checks the perception and verbalization counters. In particular, the individualized training module 118 determines whether or not the counts of each of the counters are greater than zero. If the counters are zero, then no perception or verbalization training was needed by the recipient and method 150 is terminated at 183.

However, if either the perception or the verbalization counter is greater than zero, then either perception or verbalization training was needed by the recipient. As such, at 184, the training material determination processes (i.e., 162 and/or 172 of FIGS. 2B and 2C, respectively) are updated based on the training material that was successful in the addressing the perception and/or verbalization problems. In other words, 184 is a feedback mechanism that adapts the training material determination processes based on successful training results. After this update, termination process 180 proceeds to 183 where method 150 is again terminated.

As noted, FIGS. 2A, 2B, 2C, and 2D illustrate examples in which the method 150 may be terminated at 168 (FIG. 2B) or 178 (FIG. 2C) when the corresponding counters exceed a threshold, thus triggering the system to seek the help of a professional. It is to be appreciated that the method 150 may also be terminated in other manners that cause the system to seek professional help. For example, in other embodiments, the method 150 may be determined by performing a checking regarding whether the recipient has made any progression has been made from the training material (i.e., whether the recipient's perception or verbalization has improved) by checking the recipient's progression against a common user expected progression. Based on this information, the system can make a decision as to when professional intervention is needed.

As noted above, the method 150 includes a verbalization improvement process 170 that may be executed to improve a hearing prosthesis recipient's verbalization skills. Also as noted above, an aspect of the verbalization improvement process 170 is the generation of verbalization improvement material (at 172) that is personalized for the recipient's particular deficiency/problem (i.e., to improve verbalization of specifically identified speech components that are problematic for the recipient). FIG. 3 is a flowchart illustrating an example method for generation of verbalization improvement material at 172.

The process 172 begins at 190 where one or more feature inputs are determined for the recipient. These feature inputs include the components of the test speech that have been misspoken by the recipient. That is, at 190 the perceptually distinct units (e.g., phonemes, morphemes, etc.) that have been improperly verbalized are designated as feature inputs to a training material selection algorithm. In certain embodiments, the one or more feature inputs determined for the recipient may also include recipient-specific attributes/characteristics, such as the recipient's age, age of onset of deafness, country of origin, accent, primary or first language, etc. The result is a generation of "N" feature inputs for the training material selection algorithm, where the feature inputs are based on misspoken language components and, potentially, recipient-specific attributes.

At a high-level, the training material selection algorithm includes two sub-processes, represented in FIG. 3 at 191 and 192. In particular, after determination of the N feature inputs, at 191 the feature inputs are used to associate the recipient with at least one established/predetermined recipient rehabilitation group (recipient group). Each recipient group is formed of a number of recipient "feature sets" for other recipients, either real or hypothetical. Each of these features sets are formed by one or more feature inputs that have been determined for the corresponding recipient. Stated differently, recipient groups comprise one or more recipient feature sets each generated for a specific recipient. Each of the recipient feature sets comprises one or more feature inputs selected for the specific recipient. Table 2, below, generally represents the relationship between a recipient group and recipient feature sets.

TABLE 2

| Recipient Group 1 |
| --- |
| Feature Set for Recipient A |
| Feature Set for Recipient B |
| Feature Set for Recipient C |
| Feature Set for Recipient D |

At 191, the recipient is associated with a recipient group formed by feature sets having feature inputs that match, or are substantially similar, to the N feature inputs determined for the recipient. Similar to the N features determined for the recipient, feature inputs forming the recipient feature sets may include speech components that were incorrectly verbalized by real or theoretical recipients and attributes of the recipient that incorrectly verbalized the speech components. In one form, the operations at 191 are implemented as part of a real-time pattern recognition/matching algorithm that analyzes the N feature inputs with respect to a database of known feature sets formed of feature inputs established for other recipients. This system database, which is referred to herein as a recipient feature database, may form part of, or be accessible to, the individualized training module 118. In one example, the recipient feature database is part of a cloud environment.

At 192, the recipient group to which the recipient is associated (based on the matching of the N feature inputs to recipient feature sets) is used to select training material forming a verbalization improvement program for the recipient. Further details regarding use of the recipient group with which the recipient is associated to select verbalization improvement material are provided with reference to FIGS. 4A-4D.

More specifically, FIGS. 4A-4C are a series of diagrams illustrating one specific example for generation of verbalization improvement material for a recipient. The recipient is represented in FIGS. 4A-4C by reference 405. In the example of FIGS. 4A-4C, it is determined that the recipient 405 incorrectly verbalizes the phoneme 'th' as 't,' where the phoneme 't' is represented in FIGS. 4A-4C by line 407, and the phoneme 'th' is represented by line 409. Also shown in FIGS. 4A-4C is a line 411 representing the Nth feature input.

In the examples of FIGS. 4A-4C, all feature inputs (e.g., speech components such as phonemes, recipient attributes such as age, age of onset of deafness, etc.) are assigned a numerical value or rating between 0 and 1. In this example, since 'th' is spoken by the recipient incorrectly, the 'th' is assigned a value of 0. If the 't' is spoken correctly, it is assigned a value of 1. Although values of 0 and 1 are used in this example for ease of illustration, feature inputs could also be assigned other values between 0 and 1 (e.g., a value of 0.5, etc.). In one example, a numerical value for a phoneme is based on how close the recipient's incorrect verbalization of a phoneme was to the correct verbalization of that phoneme.

Also shown in FIGS. 4A-4C are three recipient groups 401, 402, and 403. As shown, each feature set 401, 402, and 403 is formed of a number of feature sets represented by unlabeled "Xs." Initially, the recipient 405 is associated with recipient group 401 formed of feature sets where the recipient also incorrectly verbalized the phoneme 'th' as 't,' and where the recipient shares one or more of the same personal attributes as the recipient (e.g., within the same age group as the recipient, same age of onset of deafness as recipient, etc.).

Recipient group 402 is formed of feature sets where recipients correctly verbalized the phoneme 'th' and where the recipients share one or more of the same personal attributes as the recipient 405. As such, recipient group 402 is the target group for the recipient 405 and verbalization improvement material is selected so as to transition the recipient 405 from recipient group 401 to recipient group 402 (i.e., training material is specifically targeted for different groups where the transition from group to group will be optimal).

Stated differently, the verbalization improvement material includes human speech that is to be presented to the recipient via the hearing prosthesis 100 in accordance with a selected strategy (e.g., order). The human speech in the verbalization improvement material is designed to illicit verbalized responses from the recipient in a manner that causes the recipient's verbalization of the 'th' phoneme to improve. In the examples of FIGS. 4A-4C, the human speech in the verbalization improvement material is selected using known/predetermined speech that was successful in assisting recipients with similar feature inputs learn to properly verbalize the 'th' phoneme. That is, the speech is selected based on data gathered as other recipients successfully transitioned from recipient group 1 to recipient group 2.

FIGS. 4B and 4C illustrate two transitions for the recipient 405 from recipient group 401 to recipient group 402. More specifically, the recipient 405 receives a verbalization training using a first group of verbalization improvement material that results in a partial improvement in the recipient's verbalization of the phoneme 'th.' This is shown in FIG. 4B where changes in the feature inputs locate the recipient 405 between recipient groups 401 and 402. Based on the recipient's relative position (i.e., changes in the feature inputs), the recipient 405 receives a additional verbalization training using a second group of verbalization improvement material. This second group of verbalization improvement material causes the recipient to be associated with recipient group 402. That is, as a result of the additional verbalization training, the recipient 405 verbalizes the phoneme 'th' correctly.

FIG. 4D is a graph illustrating the learning trajectory 413 of the recipient 405 during his/her transition from recipient group 401 to recipient group 402 in regards to correct pronunciation versus time. Also shown in FIG. 4D is a typical or goal learning trajectory 415 of other recipients as they transitioned from recipient group 401 to recipient group 402. The recipient's learning trajectory 413 relative to the typical learning trajectory 415 indicates whether or not the verbalization training is working as expected. That is, recipients may have a typical/usual trajectory as they move from group 401 to 402 and, if a recipient deviates from that trajectory, the training may not be working properly. When this is the case, the verbalization improvement training could be adjusted to correct the recipient's trajectory.

In one example, if a recipient's trajectory is different from that of the usual trajectory, the recipient may be determined to be an outlying recipient case. In such examples, the recipient may be flagged to see a speech pathologist for special training. Over time, the information of such outlying cases are added to the recipient feature database, similar outlying recipients may be used to form new groups, thereby improving the training process for continually greater numbers of recipients.

For ease of illustration, FIGS. 3 and 4A-4D have been described with reference to a improvement of a single phoneme 'th.' It is to be appreciated that, in other embodiments, verbalization improvement training may be based on more than one incorrectly pronounced phoneme. That is, the verbalization may be initiated based on a plurality of incorrectly pronounced phonemes that would all form feature inputs for the recipient that are all used to select the appropriate verbalization improvement material.

For example, Table 3, below illustrates example results of delivery of test speech comprising the sentence: 'The runner is going fast' to a recipient.

| Test Speech | Graphical Response | Verbalized Response | Graphical Same as test speech? | Verbalized Same as test speech? | Misunderstood Phoneme | Mispronounced Phoneme | Feature Value |
|---|---|---|---|---|---|---|---|
| The | The | The | Yes | Yes | — | — | |
| runner | runner | runner | Yes | Yes | — | — | |
| is | is | is | Yes | Yes | — | — | |
| going | going | doing | Yes | No | — | G as D | D = 1 for phoneme G |
| fast | last | last | No | Yes | F as L | — | |

As noted above, the misunderstood and mispronounced components require training to correct the issues. The training material might be combined so that both the misunderstood and mispronounced components have a combined training material delivered to the recipient.

Figure 5:
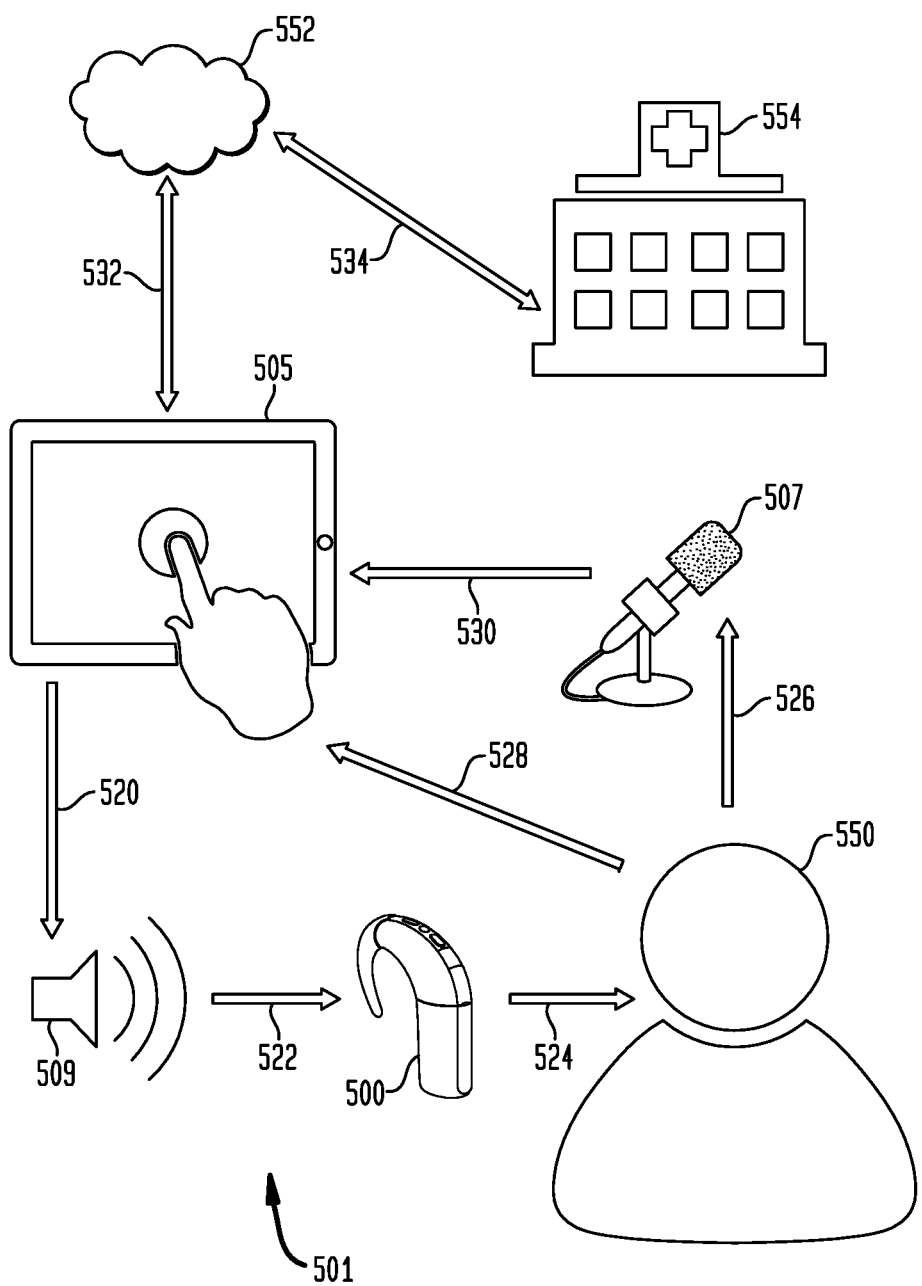
FIG. 5 is a schematic diagram illustrating an arrangement for a hearing prosthesis system in accordance with embodiments presented herein.
Figure 6:
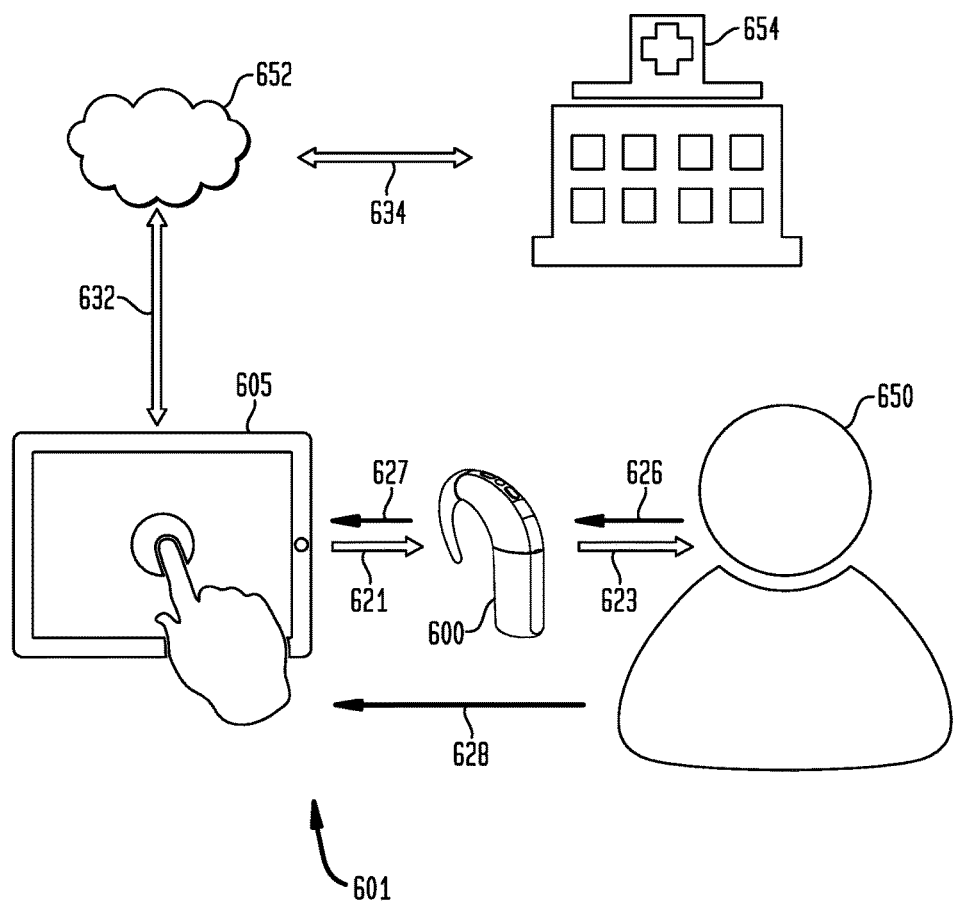
FIG. 6 is a schematic diagram illustrating another arrangement for a hearing prosthesis system in accordance with embodiments presented herein.

The embodiments presented herein may be implemented in different arrangements of hearing prosthesis systems, two examples of which are shown in FIGS. 5 and 6. Referring first to FIG. 5, a hearing prosthesis system 501 is shown. The hearing prosthesis system 501 comprises a hearing prosthesis 500 (e.g., cochlear implant, hearing aid, bone conduction device, etc.) and an external device 505. The hearing prosthesis 500 is configured to assist the hearing of a recipient 550. The external device 505 is a computing device, such as a desktop, laptop, tablet, smart phone, etc. In this example, individualized training software operates on the external device 505. That is, the external device 505 comprises memory (e.g., one or more tangible (non-transitory) computer readable storage media, such as read only memory (ROM), random access memory (RAM), or another type of physical/tangible memory storage device) configured to store the individualized training software. The external device 505 also comprises one or more processors so that, when the individualized training software is executed by the processors, the external device 505 is operable to perform the operations described herein with reference to individualized training module 118.

The external device 505 includes, or is otherwise connected to, an external microphone 507 and a receiver (speaker) 509. As described further below, the receiver 509 is configured to present test audio signals to the recipient 550 and the microphone 507 is configured to detect/receive verbalized responses of the recipient 550. Also shown in FIG. 5 is a remote cloud environment 552 that is configured to store data of a number of hearing prosthesis recipients and a clinic 554 that generally represents a location for hearing prosthesis recipient treatment, such as a cochlear implant clinic, specialized school, speech pathologist clinic, audiologist, hearing prosthesis manufacturer, etc.

Also represented by arrow 520 in FIG. 5, the external device 505 (i.e., the individualized training software) instructs the receiver 509 to deliver a test audio signal 522 to the hearing prosthesis 500. As represented by arrow 524, the hearing prosthesis 500 converts the test audio signal 522 into a test stimulation (e.g., acoustic and/or electrical stimulation) that is delivered to the recipient. As represented by arrow 528, the recipient 550 enters a graphical response at a display screen of the external device 505. As represented by arrow 526, the recipient 550 also provides a verbalized response that is detected by the microphone 507 and, as represented by arrow 530, is provided to the external device 505.

The individualized training software on the external device 505 may be executed to perform the operations of the individualized training module 118, as described above. That is, the individualized training software collects the responses from the recipient and analyzes those responses to determine if training is needed. If training is needed, then the individualized training software may generate individualized training programs, as described above.

Arrow 532 indicates that the external device 505 may transfer data, as needed, to the cloud environment 552 and arrow 534 indicates that data may be transferred from the cloud environment 552 to the clinic 554, again as needed.

Referring next to FIG. 6, a hearing prosthesis system 601 is shown. The hearing prosthesis system 601 comprises a hearing prosthesis 600 (e.g., cochlear implant, hearing aid, bone conduction device, etc.) and an external device 605. The hearing prosthesis 600 is configured to assist the hearing of a recipient 650. The external device 605 is a computing device, such as a desktop, laptop, tablet, smart phone, etc. In this example, individualized training software operates on the external device 605. That is, the external device 605 comprises memory (e.g., one or more tangible (non-transitory) computer readable storage media, such as read only memory (ROM), random access memory (RAM), or another type of physical/tangible memory storage device) configured to store the individualized training software. The external device 605 also comprises one or more processors so that, when the individualized training software is executed by the processors, the external device 605 is operable to perform the operations described herein with reference to individualized training module 118.

Also shown in FIG. 6 is a remote cloud environment 652 that is configured to store data of a number of hearing prosthesis recipients and a clinic 654 that generally represents a location for hearing prosthesis recipient treatment, such as a cochlear implant clinic, specialized school, speech pathologist clinic, audiologist, hearing prosthesis manufacturer, etc.

The example of FIG. 6 generally differs from that of FIG. 5 in the capabilities of the hearing prosthesis 600 relative to those of hearing prosthesis 500. In particular, the hearing prosthesis 600 is configured for streaming wireless communication with the external device 605 and is configured to use an integrated microphone to receive verbalized responses from the recipient. These capabilities eliminate the need for an external microphone and receiver, as utilized in the example of FIG. 5.

As represented by arrow 621, the external device 605 wirelessly streams test audio data to the hearing prosthesis 600. As represented by arrow 623, the hearing prosthesis 600 converts the test audio data into test stimulation (e.g., acoustic and/or electrical stimulation) that is delivered to the recipient 650. As represented by arrow 628, the recipient 650 enters a graphical response at a display screen of the external device 605. As represented by arrow 626, the recipient 550 also provides a verbalized response that is detected by the integrated microphone of the hearing prosthesis 600. As represented by arrow 627, the hearing prosthesis 600 then wirelessly streams the verbalized response to the external device 605.

The individualized training software on the external device 605 may be executed to perform the operations of the individualized training module 118, as described above. That is, the individualized training software collects the responses from the recipient and analyzes those responses to determine if training is needed. If training is needed, then the individualized training software may generate individualized training programs, as described above.

Arrow 632 indicates that the external device 605 may transfer data, as needed, to the cloud environment 652 and arrow 634 indicates that data may be transferred from the cloud environment 652 to the clinic 654, again as needed.

Although FIGS. 5 and 6 illustrate the individualized training software on the external device, in other arrangements the individualized training software may be executed in the cloud environment.

FIG. 7 is a flowchart of a method 700 in accordance with embodiments presented herein. Method 700 begins at 702 where a hearing prosthesis delivers test stimulation to a recipient of the hearing prosthesis. At 704, a graphical response by the recipient in response to the test stimulation is obtained and, at 706, a verbalized response by the recipient in response to the test stimulation is obtained. At 708, based on the graphical and verbalized responses, individualized training material is generated for the recipient. At 710, the individualized training material is presented to the recipient via the hearing prosthesis.

The above embodiments have been primarily described with graphical responses that are entered, for example, at a computing device by the recipient. It is to be appreciated that embodiments presented herein may be implemented using other types of graphical responses. For example, in certain examples, the graphical response may be an electroencephalogram (EEG) or any other method of determining comprehension of the test stimulation. An EEG is a test used to detect abnormalities related to electrical activity of the brain.

This procedure tracks and records recipient brain wave patterns using, for example, electrodes placed on the scalp, and then send signals to a computer to record the results. The computer then generates a graphical display (i.e., the graphical response) that enables a user to determine what the recipient perceived in response to the test stimulation. This alternative may be useful for pediatric or other recipients that are unable to use a computing device and provide a graphical response.

As detailed above, the embodiments presented herein utilize a combination of graphical and verbalized responses to provide perception and/or verbalization metrics. These metrics may include, for example, identified or non-identified speech components/tokens (e.g., voice recognition), token analysis, stress and fatigue characterization, etc. These metrics can then employed to drive rehabilitation, including perception or verbalization training, device reconfiguration, etc.

It is to be appreciated that the embodiments presented herein are not mutually exclusive.

The invention described and claimed herein is not to be limited in scope by the specific preferred embodiments herein disclosed, since these embodiments are intended as illustrations, and not limitations, of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed is:

1. A method, comprising:
   delivering, with a hearing prosthesis, test stimulation to a recipient of the hearing prosthesis;
   obtaining a graphical response by the recipient in response to the test stimulation, wherein the graphical response provides an indication of the recipient's perception of the test stimulation;
   obtaining a verbalized response by the recipient in response to the test stimulation, wherein the verbalized response provides an indication of the recipient's ability to verbalize the test stimulation;
   simultaneously analyzing the graphical response and the verbalized response in relation to the test stimulation to determine whether the recipient is suffering from one of a hearing perception problem or a verbalization problem;
   generating, based on the analysis of the graphical and verbalized responses in relation to the test stimulation, individualized training material for the recipient to address the one of the hearing perception problem or the verbalization problem; and
   presenting the individualized training material to the recipient via the hearing prosthesis.

2. The method of claim 1, wherein the test stimulation represents test speech, wherein the analyzing determines that the recipient is suffering from a hearing perception problem, and wherein generating the training material comprises:
   generating perception improvement material comprising one or more sets of human speech configured to improve the recipient's hearing perception of one or more speech components identified during the analysis of the graphical and verbalized responses relative to the test speech.

3. The method of claim 1, wherein the test stimulation represents test speech, wherein the analyzing determines that the recipient is suffering from a verbalization problem, and wherein generating the training material comprises:
   generating verbalization improvement material comprising one or more sets of human speech configured to improve the recipient's verbalization of one or more speech components identified during the analysis of the graphical and verbalized responses relative to the test speech.

4. The method of claim 3, wherein generating the verbalization improvement material comprises:
   determining one or more feature inputs for the recipient, wherein at least one of the feature inputs comprises at least one element of the test speech that has been incorrectly verbalized by the recipient; and
   executing a real-time pattern matching process that analyzes the one or more feature inputs for the recipient with respect to a database of known sets of feature inputs.

5. The method of claim 4, wherein executing a real-time pattern matching process that analyzes the one or more feature inputs for the recipient with respect to a database of known sets of feature inputs comprises:
   associating, based on the one or more feature inputs, the recipient with a predetermined recipient group; and
   selecting, based on the predetermined recipient group with which the recipient is associated, one or more sets of human speech configured to improve the recipient's verbalization of the at least one element of the test speech that has been incorrectly verbalized by the recipient.

6. The method of claim 4, wherein at least one of the one or more feature inputs comprises a personal attribute of the recipient.

7. The method of claim 1, further comprising:
   adjusting operation of the hearing prosthesis based on the analysis of the graphical and verbalized responses relative to the test speech.

8. The method of claim 7, wherein the hearing prosthesis delivers electrical and acoustic stimulation signals to the recipient, and wherein the method further comprises:
   adjusting one or more clinical settings controlling generation of the electrical or acoustic stimulation signals based on the analysis of the graphical and verbalized responses relative to the test speech.

9. The method of claim 1, wherein obtaining a graphical response by the recipient in response to the test stimulation comprises:
   receiving, at a user interface of a computing device, an indication of a word or phrase entered by the recipient.

10. The method of claim 1, wherein obtaining a verbalized response by the recipient in response to the test stimulation:
    performing automatic voice recognition on speech produced by the recipient.

11. A hearing prosthesis system, comprising:
    a hearing prosthesis configured to deliver test stimulation to a recipient; and
    one or more processors configured to:
      analyze a graphical response of the recipient to the test stimulation relative to at least a verbalized response by the recipient to the test stimulation and human speech represented by the test stimulation,
      determine, based on the analysis, whether the recipient is suffering from one of a hearing perception problem or a verbalization problem;

generate, based on the analysis, individualized training material for the recipient to address the one of the hearing perception problem or the verbalization problem, and initiate rehabilitation training of the recipient using the individualized training material.

12. The hearing prosthesis system of claim 11, wherein the analyzing determines that the recipient is suffering from a hearing perception problem, and wherein to generate the individualized training material for the recipient, the one or more processors are configured to:

generate perception improvement material comprising one or more sets of human speech configured to improve the recipient's hearing perception of one or more speech components identified during the analysis of the graphical and verbalized responses relative to the human speech represented by the test stimulation.

13. The hearing prosthesis system of claim 11, wherein the analyzing determines that the recipient is suffering from a verbalization problem, and wherein to generate the individualized training material for the recipient, the one or more processors are configured to:

generate verbalization improvement material comprising one or more sets of human speech configured to improve the recipient's verbalization of one or more speech components identified during the analysis of the graphical and verbalized responses relative to the human speech represented by the test stimulation.

14. The hearing prosthesis of claim 13, wherein to generate the verbalization improvement material, the one or more processors are configured to:

determine one or more feature inputs for the recipient, wherein at least one of the feature inputs comprises at least one element of the human speech represented by the test stimulation that has been incorrectly verbalized by the recipient; and execute a real-time pattern matching process that analyzes the one or more feature inputs for the recipient with respect to a database of known sets of feature inputs.

15. The hearing prosthesis of claim 14, wherein to execute a real-time pattern matching process that analyzes the one or more feature inputs for the recipient with respect to a database of known sets of feature inputs, the one or more processors are configured to:

associate, based on the one or more feature inputs, the recipient with a predetermined recipient group; and select, based on the predetermined recipient group with which the recipient is associated, one or more sets of human speech configured to improve the recipient's verbalization of the at least one element of the human speech represented by the test stimulation that has been incorrectly verbalized by the recipient.

16. The hearing prosthesis of claim 14, wherein at least one of the one or more feature inputs comprises a personal attribute of the recipient.

17. The hearing prosthesis system of claim 11, wherein the one or more processors are configured to:

adjust operation of the hearing prosthesis based on the analysis of the graphical and verbalized responses relative to the human speech represented by the test stimulation.

18. The method of claim 1, wherein the one or more processors are configured to:

receive, via a user interface, an indication of a word or phrase entered by the recipient representing the graphical response.

19. The method of claim 1, wherein the one or more processors are configured to:

performing automatic voice recognition on speech produced by the recipient to obtain the verbalized response.

20. The hearing prosthesis of claim 1, wherein the one or more processors are part of a computing device in wireless communication with the hearing prosthesis.

* * * * *